Patented July 17, 1951

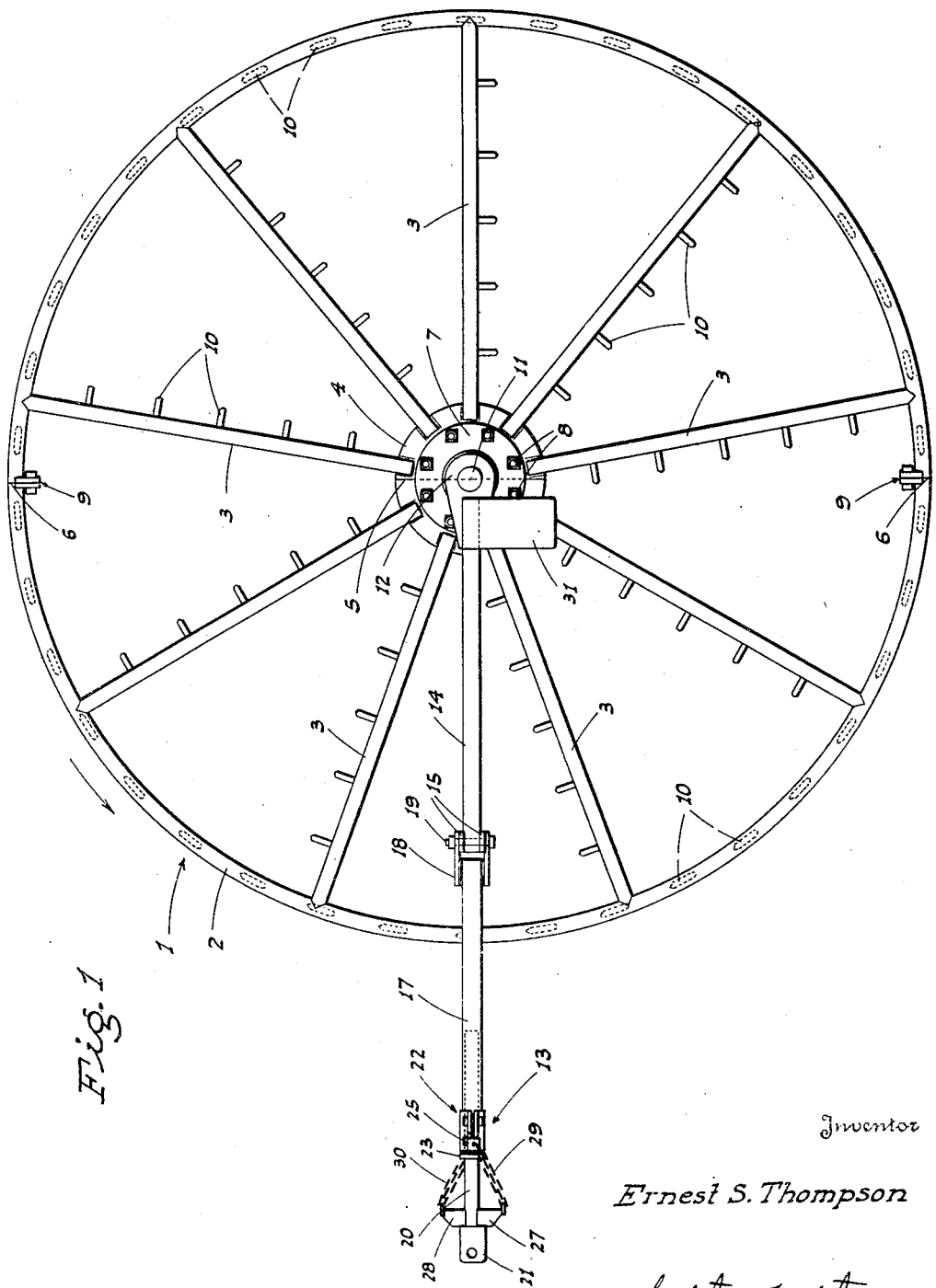

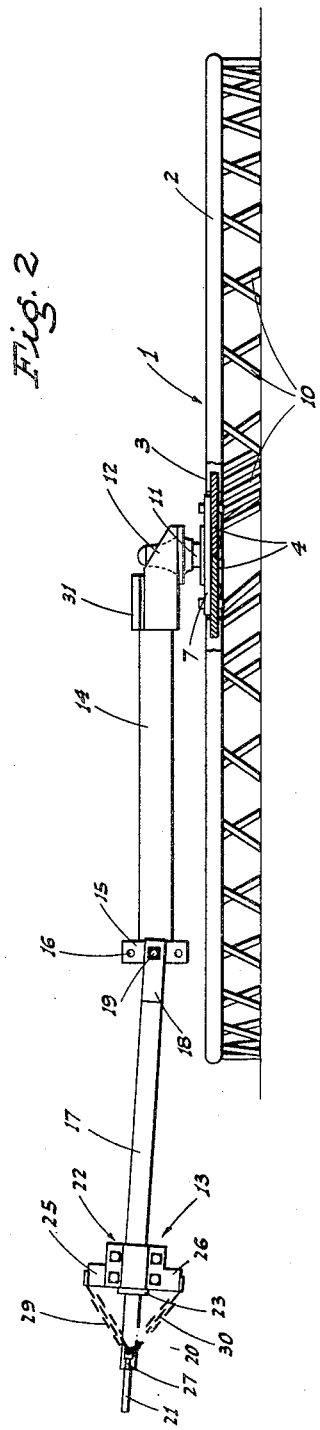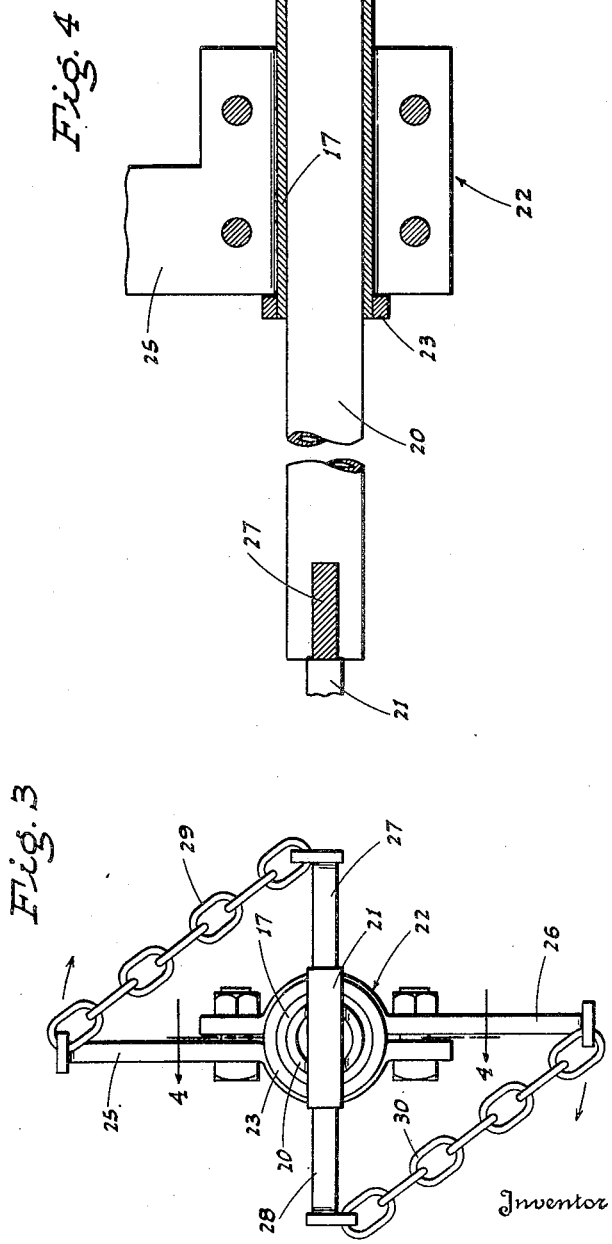

2,560,909

UNITED STATES PATENT OFFICE 2,560,909

ROTARY CIRCULAR HARROW

Ernest S. Thompson, Strathmore, Calif., assignor to himself and Ethel Thompson as joint tenants with the right of survivorship Application October 28, 1949, Serial No. 124,046

10 Claims. (Cl. 55—13)

This invention relates in general to improvements in tillage implements, and in particular is directed to a rotary circular harrow of novel construction.

One important object of the invention is to provide the rotary circular harrow with a novel hitch unit which, in operation, functions automatically to impose a torque or twisting force, about a longitudinal axis, on the rear or implement-connected portion of said hitch unit whereby a downward pressure and a lifting force are imparted to the rotary harrow on the rearwardly turning side and forwardly turning side thereof, respectively. Such pressure and lift, together with sloping of the harrow teeth contra to the direction of rotation, assure of positive and effective rotation of the harrow as it advances over the ground.

Another object of the invention is to provide a rotary circular harrow which is well balanced without need of a laterally projecting, elongated weight arm; the implement being operative to work close to trees or vines without injury thereto, and being self-cleaning.

A further object of the invention is to provide a rotary circular harrow which functions effectively to cultivate the ground over which the implement travels; such implement being useful—in addition to cultivation—to level and smooth furrows or the like.

An additional object of the invention is to provide a rotary circular harrow wherein the harrow wheel is sectional and mounted for ready detachment of the sections for convenience of transport or storage.

It is also an object of the invention to provide a rotary circular harrow designed for ease and economy of manufacture.

A still further object of the invention is to provide a reliable rotary circular harrow, and one which will be exceedingly effective for the purpose for which it is designed.

These objects are accomplished by means of such structure and relative arrangement of parts as will fully appear by a perusal of the following specification and claims.

In the drawings:

Fig. 1 is a top plan view of the rotary circular harrow.

Fig. 2 is a side elevation, partly broken away, of the harrow.

Fig. 3 is a front end elevation of the hitch unit.

Fig. 4 is a fragmentary longitudinal section of said hitch unit taken on line 4—4 of Fig. 3.

Referring now more particularly to the characters of reference on the drawings, the implement comprises a circular rotary harrow unit, indicated generally at 1, which harrow unit is wheel-like and horizontally disposed.

The harrow unit 1 comprises an annular rim 2 supported in fixed connection with the outer ends of a plurality of circumferentially spaced, radial spokes 3.

At their inner ends the spokes 3 are fixed in connection with a center disc 4. Such center disc 4 and the annular rim 2 are split in matching diametral relation, as at 5 and 6. The split center disc 4 is detachably secured in unitary, concentric relation to a circular mounting plate 7 fixed to said disc by a row of circumferentially spaced bolts 8.

At the splits 6, the adjacent ends of the annular rim 2 are detachably secured together by connections 9.

The circular rotary harrow 1 is adapted to rotate in the direction indicated by the arrow in Fig. 1 and a plurality of harrow teeth 10 are fixed in spaced relation on the rim 2 and spokes 3 and project downwardly therefrom; such teeth being inclined downwardly and rearwardly with respect to the direction of rotation.

The circular mounting plate 7 has an upstanding spindle 11 fixed centrally therein, and such spindle is journaled in a bearing 12; the latter being fixed to the rear end of a longitudinally extending hitch unit 13 which overlies the circular rotary harrow unit 1 and projects to a front end termination some distance ahead thereof. Such hitch unit 13 is constructed and functions as follows:

The rear portion of the hitch unit 13 comprises a longitudinal draft beam 14 fixed at its rear end to the bearing 12. At its front end the longitudinal draft beam 14 is fitted with a vertical connection plate 15 having a vertical row of holes 16 laterally therethrough.

A tubular tongue 17 projects forwardly from the vertical connection plate 15, and at its rear end said tongue includes a clevis 18 which vertically adjustably straddles said plate 15, being connected to the latter by a cross bolt 19 which extends through a selected one of the holes 16. With this adjustment the tubular tongue 17 can be set, vertically, in the best vertical position with respect to the tractor draft point.

A tubular pull bar 20 slidably telescopes into the tubular tongue 17 from the front end of the latter; there being a hitch plate 21 on the front end of said pull bar 20 adapted for coupling to a tractor in draft relation.

The following connection assembly is employed between the tubular tongue 17 and pull bar 20 to impose a twisting force, about a longitudinal axis, on said tongue upon draft being applied to the pull bar 20.

A substantially annular two-piece clamp 22 surrounds the tongue 17 adjacent its forward end, being held—even when loose—against forward escape from said tongue by a stop collar 23 on the latter. The two-piece clamp 22 is normally rigidly attached to the tongue 17 by tightening a pair of cross bolts 24 included in said clamp; there being opposed arms, indicated at 25 and 26, projecting—in opposed relation—upwardly and downwardly, respectively, from said clamp 22.

The pull bar 20 is formed, adjacent its front end, and some distance ahead of the clamp 22 and arms 25 and 26, with opposed, laterally outwardly projecting arms, indicated at 27 and 28.

A flexible connection, such as a chain 29, connects between the outer ends of the upwardly projecting arm 25 and the laterally outwardly projecting arm 27. Similarly, another flexible connection, such as a chain 30, connects between the outer ends of the downwardly projecting arm 26 and the laterally outwardly projecting arm 28. The chains thus extend diagonally between said points, in both a horizontal and vertical plane, with respect to the longitudinal axis of the pull bar 20.

When the hitch unit 13 is connected in draft relation to a tractor, the pull bar 20 tends to slide forwardly in the tubular tongue 17, but is restricted by the chains 29 and 30; the described connection of said chains causing a torque to be applied to the tongue 17, i. e. tending to rotate said tongue, and consequently the draft beam 14 and rotary harrow unit 1, about a longitudinal axis.

This occurs for the reason that as the diagonal chains are placed under tension, they exert a pull in a like rotary direction on the arms 25 and 26.

The torque which is thus applied to the draft beam 14 is in a direction which produces a downward pressure on the circular rotary harrow unit 1 on the side thereof which turns rearwardly; this being desirable to the end that better ground engagement of the teeth 10 on said side is accomplished, assuring of positive and effective rotation of said harrow unit 1 in response to travel along the ground. Additionally, the torque results in a lifting force being applied to the side of the harrow unit 1 which turns forwardly, further assuring of rotation of said harrow unit when it is in operation.

With a torque or twist producing hitch, as described above, the implement functions properly under normal conditions without the need of supplementary weight thereon. Should supplementary weight be desirable for abnormal conditions, a weight platform 31 is fixed on and projects laterally from the rear end of the draft beam 14 in a direction toward the side of the circular rotary harrow unit which turns rearwardly. A weight, such as a relatively heavy block of cement or the like, may be placed on the platform 31 to increase ground penetration by the teeth 10.

The degree of torque, and consequently the extent of downward pressure on the rearwardly turning side of the rotary harrow unit 1, may be regulated by rotatably adjusting the clamp 22 on the tubular tongue 17.

The described circular rotary harrow is well balanced, runs evenly, and drives positively from the ground; the harrow being self-cleaning by reason of the fact that the teeth 10 incline downwardly and rearwardly with respect to the direction of rotation.

The implement is very practical and reliable for harrow type cultivation, and additionally is useful for leveling and smoothing furrows or the like.

As the circular rotary harrow unit 1 is of relatively great diameter, the split construction thereof is necessary to permit said harrow unit to be knocked down for transport or for storage. This is accomplished by removing the bolts 8 and detaching the connections 9, whereupon the halves of said harrow unit 1 are separated from each other and from the hitch unit 13.

From the foregoing description it will be readily seen that there has been produced such an implement as substantially fulfills the objects of the invention, as set forth herein.

While this specification sets forth in detail the present and preferred construction of such implement, still in practice such deviations from such detail may be resorted to as do not form a departure from the spirit of the invention, as defined by the appended claims.

Having thus described the invention, the following is claimed as new and useful, and upon which Letters Patent are desired:

1. An implement comprising a substantially horizontal circular harrow adapted to rotate in a predetermined direction, an upstanding axis spindle and bearing assembly secured centrally on the harrow, and a longitudinal hitch unit fixed to said assembly and projecting forwardly for connection to a tractor in draft relation; and means incorporated in the hitch unit to cause a rotative torque in a certain direction to be imparted to the rear portion of said unit upon a draft pull being applied to the forward portion thereof by the tractor.

2. An implement comprising a substantially horizontal circular harrow adapted to rotate in a predetermined direction and including depending ground-engaging teeth, an upstanding axis spindle and bearing assembly secured centrally on the harrow, and a longitudinal hitch unit fixed to said assembly and projecting forwardly for connection to a tractor in draft relation; and means incorporated in the hitch unit to impart a rotative torque to the rear portion of said unit in a direction to apply downward pressure on that side of the harrow which turns rearwardly upon a draft pull being applied to the forward portion thereof by the tractor.

3. An implement comprising a substantially horizontal circular harrow adapted to rotate in a predetermined direction, an upstanding axis spindle and bearing assembly secured centrally on the harrow, and a longitudinal hitch unit fixed to said assembly and projecting forwardly for connection to a tractor in draft relation; the hitch unit including a forward portion and a rear portion mounted in longitudinally movable relation, and mechanism connected between said portions to restrict relative longitudinal movement therebetween and convert pull on the forward portion by the tractor to torque which is imposed on the rear portion.

4. An implement comprising a substantially horizontal circular harrow adapted to rotate in a predetermined direction, an upstanding axis spindle and bearing assembly secured centrally on the harrow, and a longitudinal hitch unit fixed to said assembly and projecting forwardly for connection to a tractor in draft relation; the hitch unit including a forward member and a rear member mounted for relative longitudinal sliding motion, arms projecting laterally from said members in longitudinally and circumferentially spaced relation, and flexible connections between said arms operative to convert pull on the forward member to torque which is imposed on the rear member and thence reflected as downward pressure on one side of the harrow.

5. An implement comprising a substantially horizontal circular harrow adapted to rotate in a predetermined direction, an upstanding axis spindle and bearing assembly secured centrally on the harrow, and a longitudinal hitch unit fixed to said assembly and projecting forwardly for connection to a tractor in draft relation; the hitch unit including a forward member and a rear member mounted for relative longitudinal sliding motion, a pair of opposed arms projecting upward and downward from one member, another pair of opposed arms projecting laterally outward from the other member, and flexible connections extending diagonally between the outer ends of corresponding arms on the separate members; said connections being operative to convert pull on the forward member to torque which is imposed on the rear member and thence reflected as downward pressure on one side of the harrow.

6. An implement, as in claim 5, in which at least one pair of arms radiate from a clamp rotatably adjustably mounted on the corresponding member.

7. An implement comprising a substantially horizontal circular harrow adapted to rotate in a predetermined direction, an upstanding axis spindle and bearing assembly secured centrally on the harrow, and a longitudinal hitch unit fixed to said assembly and projecting forwardly for connection to a tractor in draft relation; said hitch unit comprising a longitudinal draft beam fixed at the rear of the spindle and bearing assembly, a tongue projecting longitudinally ahead of the draft beam, a vertically adjustable transverse axis pivotal connection between adjacent ends of said beam and tongue, and mechanism included in the hitch unit ahead of said connection arranged to cause a rotative torque to be imparted to the rear portion of said hitch unit in response to pull on the latter by a tractor.

8. An implement comprising a substantially horizontal circular harrow adapted to rotate in a predetermined direction, an upstanding axis spindle and bearing assembly secured centrally on the harrow, and a longitudinal hitch unit fixed to said assembly and projecting forwardly for connection to a tractor in draft relation; said hitch unit including a longitudinal tongue and a pull bar in longitudinally slidable relation, the pull bar projecting ahead of the tongue, a pair of opposed arms projecting from the tongue, a pair of opposed arms projecting from the pull bar in circumferentially spaced relation to said first named pair of arms, and flexbile connections between the outer ends of corresponding arms of said pairs.

9. An implement, as in claim 8, in which said tongue and pull bar are arranged in telescopic relation.

10. An implement comprising a substantially horizontal circular harrow adapted to rotate in a predetermined direction, an upstanding axis spindle and bearing assembly secured centrally on the harrow, and a longitudinal hitch unit fixed to said assembly and projecting forwardly for connection to a tractor in draft relation; the harrow comprising a pair of initially separate half-sections, and means detachably securing said sections together; said means including a split central disc, said disc having a half on each section, and a mounting plate bolted to said split central disc, the spindle and bearing assembly being fixed to said mounting plate.

ERNEST S. THOMPSON.

REFERENCES CITED

The following references are of record in the file of this patent:

UNITED STATES PATENTS

| Number | Name | Date |
|---|---|---|
| 1,578,102 | Stotz | Mar. 23, 1926 |
| 2,020,620 | Smith | Nov. 12, 1935 |